US012712760B2

(12) United States Patent
Wandres et al.

(10) Patent No.: US 12,712,760 B2
(45) Date of Patent: Aug. 18, 2026

(54) DISCONNECTOR ASSEMBLY FOR AN ON-BOARD NETWORK OF A VEHICLE

(71) Applicants: Eberspächer Controls Landau GmbH & Co. KG, Landau (DE); Eberspächer Controls Esslingen GmbH & Co. KG, Esslingen (DE)

(72) Inventors: Steffen Wandres, Kandel (DE); Michael Kriessl, Göppingen (DE)

(73) Assignees: Eberspächer Controls Landau GmbH & Co. KG, Landau (DE); Eberspächer Controls Esslingen GmbH & Co. KG, Esslingen (DE)

( * ) Notice: Subject to any disclaimer, the term of this patent is extended or adjusted under 35 U.S.C. 154(b) by 410 days.

(21) Appl. No.: 18/364,295

(22) Filed: Aug. 2, 2023

(65) Prior Publication Data

US 2024/0048406 A1 Feb. 8, 2024

(30) Foreign Application Priority Data

Aug. 3, 2022 (DE) ..................... 10 2022 119 431.0

(51) Int. Cl.
*H04L 12/40* (2006.01)

(52) U.S. Cl.
CPC .................. *H04L 12/40045* (2013.01); *H04L 2012/40273* (2013.01)

(58) Field of Classification Search
CPC .... H04L 12/40045; H04L 2012/40273; H03K 17/0822; H03K 17/122; H03K 2217/0027;

(Continued)

(56) References Cited

U.S. PATENT DOCUMENTS

2001/0040480 A1 11/2001 Lee
2006/0209494 A1* 9/2006 Grundl .................. H02M 7/003 361/319

(Continued)

FOREIGN PATENT DOCUMENTS

DE 10 2019 105 109 A1 9/2019
DE 10 2019 108 541 A1 10/2020

(Continued)

OTHER PUBLICATIONS

Translation of the Korean Office action dated Nov. 16, 2024 in corresponding Korean application 10-2023-010158.

*Primary Examiner* — Stephen J Clawson
(74) *Attorney, Agent, or Firm* — Walter Ottesen, P.A.

(57) ABSTRACT

A disconnector assembly for an on-board voltage network of a vehicle, for the optional connection of a voltage source to a load and the isolation of the voltage source from the load, includes a voltage source terminal region and a load terminal region, and a plurality of MOSFET disconnecting switch elements which are mutually connected in parallel. At least one MOSFET disconnecting switch element of the plurality of MOSFET disconnecting switch elements is configured as a current monitoring disconnecting switch element for the delivery of a representative current variable for a current flowing between the voltage source terminal region and the load terminal region, and at least one MOSFET disconnecting switch element of the plurality of MOSFET disconnecting switch elements is not configured as a current monitoring disconnecting switch element.

17 Claims, 1 Drawing Sheet

(58) Field of Classification Search
CPC ...... B60R 16/033; H01H 33/26; H01H 9/541; H02J 7/0047; H02J 7/0063; G01R 19/0092; G01R 19/16571
See application file for complete search history.

(56) References Cited

U.S. PATENT DOCUMENTS

| | | | | |
|---|---|---|---|---|
| 2014/0321012 | A1 | 10/2014 | Nakayama | |
| 2019/0273488 | A1 | 9/2019 | Reiter et al. | |
| 2020/0319233 | A1 | 10/2020 | Wandres et al. | |
| 2020/0403397 | A1 | 12/2020 | Nakagawa et al. | |
| 2021/0006241 | A1 | 1/2021 | Uchino et al. | |
| 2021/0126632 | A1* | 4/2021 | Illing | H03K 17/122 |
| 2021/0167688 | A1* | 6/2021 | Hureau | H02M 3/1584 |
| 2022/0014184 | A1 | 1/2022 | Sato | |
| 2023/0309278 | A1 | 9/2023 | Yu | |

FOREIGN PATENT DOCUMENTS

| | | | |
|---|---|---|---|
| DE | 10 2019 128 849 | B3 | 2/2021 |
| EP | 2 701 255 | A1 | 2/2014 |
| JP | 6-677796 | A | 3/1994 |
| JP | 2002-9599 | A | 1/2002 |
| JP | 2003-151076 | A | 5/2003 |
| JP | 2006-86507 | A | 3/2006 |
| JP | 2013-175042 | A | 9/2013 |
| JP | 2017-215291 | A | 12/2017 |
| JP | 2019-169873 | A | 10/2019 |
| JP | 2020-205553 | A | 12/2020 |
| KR | 10-2022-0052103 | A | 4/2022 |
| WO | 2013/125366 | A1 | 7/2015 |

* cited by examiner

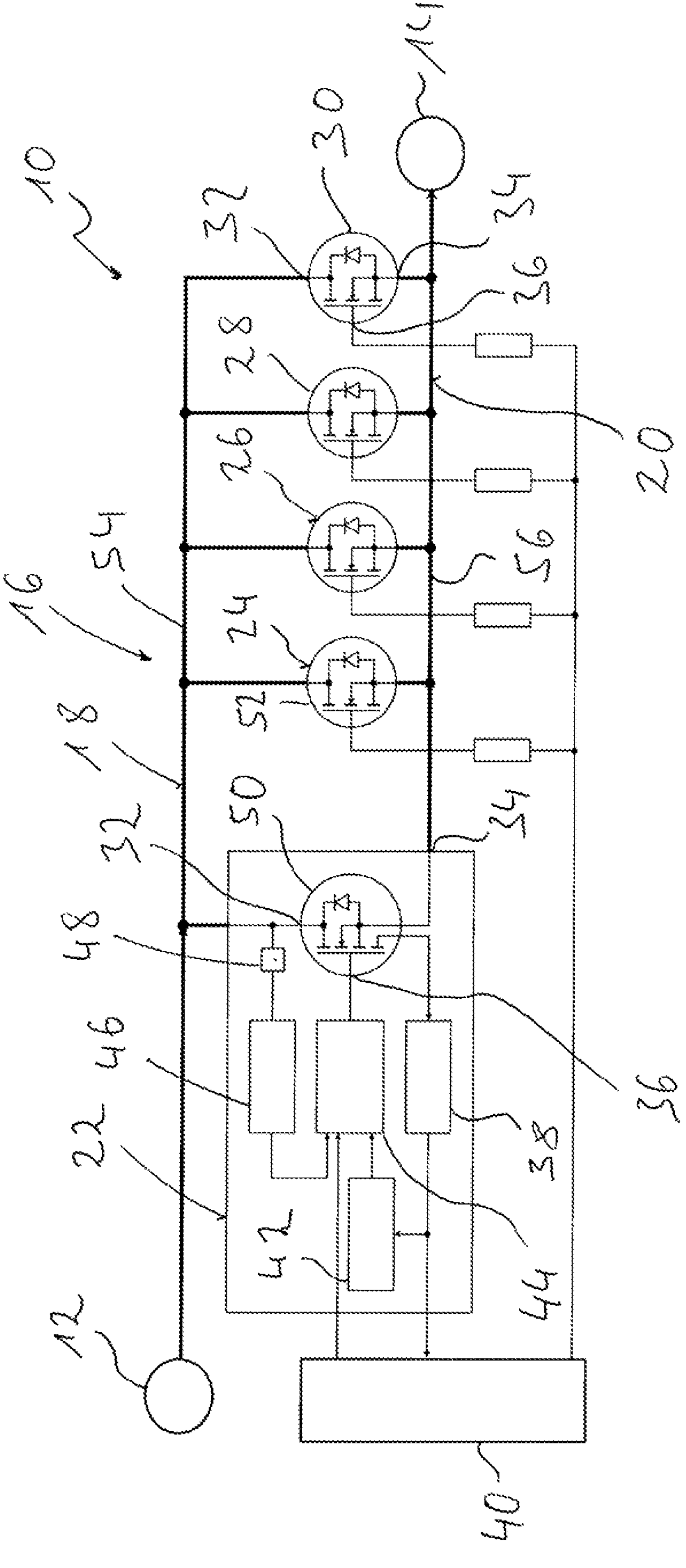
10
12
14
16
18
20
22
24
26
28
30
32
34
36
38
40
42
44
46
48
50
52
54
56

DISCONNECTOR ASSEMBLY FOR AN ON-BOARD NETWORK OF A VEHICLE

CROSS-REFERENCE TO RELATED APPLICATIONS

This application claims priority of German patent application no. 10 2022 119 431.0, filed Aug. 3, 2022, the entire content of which is incorporated herein by reference.

TECHNICAL FIELD

The present disclosure relates to a disconnector assembly for an on-board voltage network of a vehicle, for the optional connection of a voltage source to a load and the isolation of the voltage source from the load.

BACKGROUND

In order to permit the detection of the occurrence of current surges or short-circuits in the on-board voltage network of a vehicle, it is known, for example, for a current measurement unit to be assigned to an on-board voltage network of this type, in a manner which is known, for example, from US 2020/0319233. In this current measurement unit, a shunt resistor is connected between two conductor rails. In order to detect the electric current flowing through the shunt resistor, two instrument conducting tracks are assigned to the latter, via which a voltage drop across the shunt resistor and thus, additionally, the electric current flowing therein, can be detected. In the event of high load currents, comparatively high capacity losses occur across a low-resistance shunt resistor of this type whereas, in the event of low currents, it is necessary for the correspondingly low measurement values to be amplified to an evaluable signal level by an operational amplifier, thereby resulting in additional energy consumption.

SUMMARY

It is an object of the present disclosure to provide a disconnector assembly for an on-board voltage network of a vehicle via which, in a simple and reliable manner, and essentially with no additional energy consumption, information can be delivered on the electric current flowing in an on-board voltage network.

According to the disclosure, the above object is, for example, achieved by a disconnector assembly for an on-board voltage network of a vehicle, for the optional connection of a voltage source to a load and the isolation of the voltage source from the load, including a voltage source terminal region and a load terminal region, and a plurality of MOSFET disconnecting switch elements which are mutually connected in parallel, wherein at least one MOSFET disconnecting switch element of the plurality of MOSFET disconnecting switch elements is configured as a current monitoring disconnecting switch element for the delivery of a representative current variable for a current flowing between the voltage source terminal region and the load terminal region, and at least one MOSFET disconnecting switch element of the plurality of MOSFET disconnecting switch elements is not configured as a current monitoring disconnecting switch element.

A disconnector assembly structured according to the disclosure employs various types of MOSFET disconnecting switch elements. MOSFET disconnecting switch elements which are not configured as current monitoring disconnecting switch elements are essentially load switches via which, during the operation of a vehicle, that is, with a load connected to the voltage source, a substantial proportion of electric current flows. The at least one MOSFET disconnecting switch element which is configured as a current monitoring disconnecting switch element, and is generally described as an IPS (intelligent power switch), in service, consistently conducts a proportion of the electric current flowing between the voltage source and the load, but only a significantly smaller proportion than that carried by the MOSFET disconnecting switch element(s) which is (are) not configured as a current monitoring disconnecting switch element, and which function as load switches. This proportion of the overall current is sufficient to ensure an accurate detection of the current flowing through the at least one MOSFET disconnecting switch element which is configured as a current monitoring disconnecting switch element, but is also sufficiently small to ensure that, even in the event of high loading, the permissible short-circuit current of a MOSFET disconnecting switch element which is thus configured as a current monitoring disconnecting switch element, in principle, will not be exceeded.

In order to permit the delivery of the requisite information on the magnitude of current using a simply structured and cost-effective layout, it is proposed that a single MOSFET disconnecting switch element is configured as a current monitoring disconnecting switch element, and/or that a plurality of MOSFET disconnecting switch elements are not configured as current monitoring disconnecting switch elements.

In a layout of a disconnector assembly according to the disclosure, each MOSFET disconnecting switch element can include a voltage source terminal which is connected to the voltage source terminal region, preferably a drain terminal, a load terminal which is connected to the load terminal region, preferably a source terminal, and a gate terminal which is connected to a control unit.

In order to maintain power losses in the disconnector assembly as low as possible, it is proposed that the at least one MOSFET disconnecting switch element which is configured as a current monitoring disconnecting switch element, in its conducting state, wherein the voltage source is connected to the load, should include a voltage monitoring disconnecting switch element resistance between its voltage source terminal and its load terminal, that the at least one MOSFET disconnecting switch element which is not configured as a current monitoring disconnecting switch element, in its conducting state, wherein the voltage source is connected to the load, should include a MOSFET disconnecting switch element resistance between its voltage source terminal and its load terminal, and that the current monitoring disconnecting switch element resistance should be greater than the MOSFET disconnecting switch element resistance.

In particular, a sufficiently high current flux for accurate detection via the configuration which provides for at least one current monitoring disconnecting switch element can thus be achieved if a ratio of the total MOSFET disconnecting switch element resistance of all the MOSFET disconnecting switch elements which are not configured as current monitoring disconnecting switch elements to the total MOSFET disconnecting switch element resistance of all the MOSFET disconnecting switch elements which are configured as current monitoring disconnecting switch elements lies within a range of 0.05-0.15.

In order to protect the at least one MOSFET disconnecting switch element which is configured as a current monitoring disconnecting switch element against an excessively high current, the latter can incorporate an overcurrent protection circuit, wherein the overcurrent protection circuit is configured, in the event of an electric current between the voltage source terminal and the load terminal of the at least one MOSFET disconnecting switch element which is configured as a current monitoring disconnecting switch element, to switch the at least one MOSFET disconnecting switch element which is configured as a current monitoring disconnecting switch element to a state wherein the voltage source is isolated from the load, or to execute the maintenance thereof in this state.

In order to further protect the at least one MOSFET disconnecting switch element which is configured as a current monitoring disconnecting switch element against overheating, the latter can incorporate an overtemperature protection circuit, wherein the overtemperature protection circuit is configured, in the event of a temperature on the at least one MOSFET disconnecting switch element which is configured as a current monitoring disconnecting switch element which exceeds a threshold temperature, to switch the at least one MOSFET disconnecting switch element which is configured as a current monitoring disconnecting switch element to a state wherein the voltage source is isolated from the load, or to execute the maintenance thereof in this state.

In order to permit the optional conduction of the electric current flowing between the voltage source and the load via the at least one current monitoring disconnecting switch element, it is proposed that the at least one MOSFET disconnecting switch element which is configured as a current monitoring disconnecting switch element, independently of the at least one, and preferably of each MOSFET disconnecting switch element which is not configured as a current monitoring disconnecting switch element, is switchable to a state for connecting the voltage source to the load, and to a state for isolating the voltage source from the load.

In the interests of the simple execution of a circuit layout, it can be provided that all those MOSFET disconnecting switch elements which are not configured as current monitoring disconnecting switch elements are commonly switchable to a state for connecting the voltage source to the load, and to a state for isolating the voltage source from the load. Accordingly, any mutually independent actuation of these MOSFET disconnecting switch elements is not required.

In the interests of the accurate detection of the electric current flowing between the voltage source and the load, in order to prevent the occurrence of temperature differences between the various MOSFET disconnecting switch elements, it is proposed that the voltage source terminal region should include a conductor rail which is connected to all the MOSFET disconnecting switch elements in an electrically and thermally conductive manner, preferably a copper rail, and/or that the load terminal region should include a conductor rail which is connected to all the MOSFET disconnecting switch elements in an electrically and thermally conductive manner, preferably a copper rail.

The disclosure further relates to an on-board voltage network for a vehicle, including a voltage source and a load which is to be supplied with electrical energy by the voltage source, and further including a disconnector assembly which is configured according to the disclosure, wherein the voltage source terminal region of the disconnector assembly is connected to the voltage source, and the load terminal region is connected to the load.

The disclosure further relates to a method for operating an on-board voltage network of this type, by which method, in a low-load operating state of the on-board voltage network, at least one MOSFET disconnecting switch element which is configured as a current monitoring disconnecting switch element is switched to a state for connecting the voltage source to the load, and at least one MOSFET disconnecting switch element which is not configured as a current monitoring disconnecting switch element is switched to a state for isolating the voltage source from the load. A low-load operating state of this type can be, for example, a parked state of the vehicle, in which load demand is essentially included of loads such as, for example, an alarm system or other safety systems, which entail only limited loading of the on-board voltage network such that, additionally, only a current flux which does not overload the at least one MOSFET disconnecting switch element which is configured as a current monitoring disconnecting switch element is conducted. Given that, in this state, the total current flows via the at least one MOSFET disconnecting switch element which is configured as a current monitoring disconnecting switch element, a comparatively high accuracy of detection of the current flux can be achieved via the latter.

In a method according to the disclosure, it can preferably be provided that, in the low-load operating state, each MOSFET disconnecting switch element which is configured as a current monitoring disconnecting switch element is switched to a state for connecting the voltage source to the load, and/or that each MOSFET disconnecting switch element which is not configured as a current monitoring disconnecting switch element is switched to a state for isolating the voltage source from the load.

Upon the occurrence of higher loads, for example associated with the switch-on of a parking heater or of other electrical energy loads, in order to prevent any overloading of the at least one MOSFET disconnecting switch element which is configured as a current monitoring disconnecting switch element, it is proposed, in the event that, in a low-load operating state, all MOSFET disconnecting switch elements which are not configured as current monitoring disconnecting switch elements are switched to a state for isolating the voltage source from the load, that at least a proportion, and preferably all the MOSFET disconnecting switch elements which are not configured as current monitoring disconnecting switch elements should be switched to a state for connecting the voltage source to the load, in the event that the magnitude of current delivered by the at least one MOSFET disconnecting switch element which is configured as a current monitoring disconnecting switch element indicates an electric current which exceeds a current threshold and/or indicates a temporal variation in the electric current which exceeds a threshold current gradient.

In order to ensure, in each operating state of an on-board voltage network of a vehicle in which a load is to be supplied from the voltage source, the availability of information on the electric current flowing between the voltage source and the load, it is further proposed that, if the voltage source is to be connected to the load via the disconnector assembly, at least the at least one MOSFET disconnecting switch element which is configured as a current monitoring disconnecting switch element is switched to a state for connecting the voltage source to the load.

The present disclosure is described in detail hereinafter with reference to the attached FIGURE, which represents a schematic circuit diagram of a disconnector assembly in an on-board voltage network of a vehicle.

BRIEF DESCRIPTION OF DRAWINGS

The invention will now be described with reference to the single FIGURE of the drawing (FIG. 1) which shows a sub-region of an on-board voltage network of a vehicle.

DETAILED DESCRIPTION

FIG. 1 represents a sub-region of an on-board voltage network of a vehicle, which is identified overall by the number 10. The part of the on-board voltage 10 network represented in FIG. 1 shows a voltage source 12, a load 14 included of a plurality of electrical energy loads, and a disconnector assembly 16 for the optional connection of the load 14 to, or the isolation thereof from the voltage source 12. The disconnector assembly 16 includes a voltage source terminal region 18 which is connected to the voltage source 12, for example to the positive pole of a battery or an accumulator, and a load terminal region 20 which is connected to the load 14.

The disconnector assembly 16 further includes a plurality of MOSFET disconnecting switch elements 22, 24, 26, 28, 30. Each MOSFET disconnecting switch element 22, 24, 26, 28, 30 includes a voltage source terminal 32, a load terminal 34 and a gate terminal 36. In a configuration of MOSFET disconnecting switch elements 22, 24, 26, 38, 30 as n-channel MOSFETs, the voltage source terminal region 32 is essentially provided by the drain terminal, or is connected thereto, whereas the load terminal region 34 is essentially provided by the source terminal, or is connected thereto.

In the disconnector assembly 16 represented in FIG. 1, the MOSFET disconnecting switch element 22 is configured as a current monitoring disconnecting switch element which, via a load current detection circuit 38, delivers a representative current variable which is equal to the electric current flowing between the voltage source terminal 32 and the load terminal 34, and which transmits this information, for example to a control unit 40.

The MOSFET disconnecting switch element 22 which is configured as a current monitoring disconnecting switch element further includes an overcurrent protection circuit 42. The current variable is also fed to the latter and, on the basis of the current variable, the overvoltage protection circuit 42 identifies whether the electric current flowing between the voltage source terminal 32 and the load terminal 34 exceeds or undershoots a maximum permissible short-circuit current. If the latter is achieved or exceeded, the overcurrent protection circuit 42 actuates a gate actuation unit or charge carrier pump 44 of the MOSFET disconnecting switch element 22 which is configured as a current monitoring disconnecting switch element, such that the conductive connection between the voltage source terminal 32 and the load terminal 34 is interrupted, and the MOSFET disconnecting switch element 22 is switched to a state in which the voltage source 12 is isolated from the load 14.

Likewise, the MOSFET disconnecting switch element 22 which is configured as a current monitoring disconnecting switch element includes an overtemperature protection circuit 46. Information on the temperature in the region of MOSFET disconnecting switch element 22 which is configured as a current monitoring disconnecting switch element is fed to the latter from a temperature sensor 48. If this temperature exceeds a permissible threshold temperature, the gate actuation unit 44 is likewise actuated to interrupt the conductive connection between the voltage source terminal 32, that is, the drain terminal, and the load terminal 34, that is, the source terminal.

In principle, in order to permit the switchover of the MOSFET disconnecting switch element 22 which is configured as a current monitoring disconnecting switch element between a conducting state, that is, a state in which the latter connects the voltage source 12 to the load 14, and an open state, that is, a state in which the voltage source 12 is isolated from the load 14, the gate actuation unit 44 is connected in an actuating arrangement to the actuation unit 40 wherein, according to the required operation for the vehicle of the load 14, or the requisite electrical energy for the individual loads thereof, a corresponding actuation signal output is generated on the gate actuation unit 44 such that, if required, a conducting state of the MOSFET switch 50 which is a key element of the MOSFET disconnecting switch element 22 is established.

The further MOSFET disconnecting switch elements 24, 26, 28, 30 are not configured as current-monitoring disconnecting switch elements but, in combination with their MOSFET switches 52, form conventional load switches which, by the corresponding actuation of the gate terminals 36 thereof, can be switched to a conducting state, in which the voltage source 12 is connected to the load 14. As illustrated in FIG. 1, all the MOSFET disconnecting switch elements 24, 26, 28, 30 which are not configured as current monitoring disconnecting switch elements are commonly actuated by the actuation unit 40, such that the latter can be switched over in common, that is, by the output of a single actuation signal, between their conducing state and their open state.

A key distinction between the MOSFET disconnecting switch element 22 which is configured as a current monitoring disconnecting switch element, and is generally designated as an IPS (intelligent power switch), and the MOSFET disconnecting switch elements 24, 26, 28, 30 which function as load switches, and are not configured as current monitoring disconnecting switch elements, is provided in that, in the conducting state, MOSFET disconnecting switch element 22 which is configured as a current monitoring disconnecting switch element has a comparatively high resistance, having an electrical resistance in the mΩ range, whereas the MOSFET disconnecting switch elements 24, 26, 28, 30 which are not configured as current monitoring disconnecting switch elements, in the conducting state, assume a low resistance, having an electrical resistance in the μΩ range. A further key distinction is provided in that, for the MOSFET disconnecting switch element 22 which is configured as a current monitoring disconnecting switch element, the maximum permissible current lies within a maximum range of 100 to 150 A whereas, in each case, a current of several 100 A can be conducted by the MOSFET disconnecting switch elements 24, 26, 28, 30 which function as load switches, and are not configured as current monitoring disconnecting switch elements.

On the grounds of differing resistances in the conducting state, if a current of several 100 A, for example up to 600 A, is to be routed from the voltage source 12 to the load 14, a major proportion of the electric current flows via the mutually parallel-connected MOSFET disconnecting switch elements 24, 26, 28, 30 which are not configured as current monitoring disconnecting switch elements, whereas a significantly lower current flows via the MOSFET disconnecting switch element 22 which is connected in parallel with the MOSFET disconnecting switch elements 24, 26, 28, 30 which are not configured as current monitoring disconnecting switch elements. A contributory element hereto is that, on the grounds of the parallel connection of the low-resistance MOSFET disconnecting switch elements 24, 26, 28, 30 which are not configured as current monitoring disconnecting switch elements, the overall electrical resistance provided by the latter is of the order of 5 to 15% of that provided by the MOSFET disconnecting switch element 22 which is configured as a current monitoring disconnecting switch element.

As the ratio of the various electrical resistances are known, by the provision of a current variable which essentially corresponds only to the electric current flowing via the MOSFET disconnecting switch element 22 which is configured as a current monitoring disconnecting switch element, the electric current flowing in the entire disconnector assembly 16 is inferred such that, in consideration of the various electrical resistances of the various MOSFET disconnecting switch elements 22, 24, 26, 28, 30, and in consideration of the circumstance whereby an equal electric voltage is present on all the MOSFET disconnecting switch elements 22, 24, 26, 28, 30, via the current variable, it is possible to conclude the entire electric current flowing between the voltage source 12 and the load 14.

Given that, during the production of semiconductor elements of this type, manufacturing tolerances can also result in at least minor deviations in electrical resistances, it is advantageous, in a calibration process, to determine the electrical resistances of MOSFET disconnecting switch elements 22, 24, 26, 28 or 30 which are employed in the disconnector assembly 16, or of the MOSFET switches 50, 52 themselves, and then to establish, in consideration of electrical resistances thus determined, a calculation base via which, by reference to the current variable indicated for the current flowing via the MOSFET disconnecting switch element 22, it is possible to determine the entire electric current flowing in the disconnector assembly 16.

In the interests of the accurate detection of this electric current, including the consideration of the individual resistance values of the various MOSFET disconnecting switch elements 22, 24, 26, 28, 30 employed in the disconnector assembly 16, in order to permit the accurate determination of the electric current flowing in the disconnector assembly 16, in consideration of the current variable, it is further advantageous or necessary to ensure that approximately equivalent conditions of temperature are present on the various MOSFET disconnecting switch elements 22, 24, 26, 28, 30, and that these do not undergo heat-up of varying magnitude, thereby assuming different temperatures. In order to achieve this, it is advantageous for all the MOSFET disconnecting switch elements 22, 24, 26, 28, 30, for example at their drain terminals, which respectively form a main terminal, that is, the voltage source terminals 32 thereof, to be formed, for example, of a copper material, and for a conductor rail 54 of the voltage source terminal region 18 to be provided by way of a comparatively solid component. Via the conductor rail 54, not only are the voltage source terminals 32 of the various MOSFET disconnecting switch elements 22, 24, 26, 28, 30 mutually connected in an electrically conductive manner, but the MOSFET switch(es) 50, 52 thereof are also mutually connected in a thermally conductive manner. A temperature equalization between the latter can thus be achieved, and it is ensured that they assume an essentially equal temperature level. Alternatively or additionally, the load terminal region 20 of the disconnector assembly 16 might be configured with a conductor rail 56 of this type which is formed, for example, of a copper material.

In order to ensure that, in a disconnector assembly 16 configured according to the disclosure, or in the on-board voltage network 10 which incorporates the latter, whenever the load 14 is supplied with electrical energy from the voltage source 12, information on the electric current flowing between the voltage source 12 and the load is available at all times, if the disconnector assembly 16 is switched to a state in which the voltage source 12 is connected to the load 14, at least the MOSFET disconnecting switch element 22 which is configured as a current monitoring disconnecting switch element is switched to its conducting state, that is, the state wherein the voltage source 12 is connected to the load 14.

If the vehicle or the on-board voltage network 10 is in a low-load state in which, on the grounds of low loading or a limited load demand, only a comparatively low current is anticipated, for example in a parked state of a vehicle, it can be sufficient for only the MOSFET disconnecting switch element 22 which is configured as a current monitoring disconnecting switch element to be switched to a conducting state, whereas the MOSFET disconnecting switch elements 24, 26, 28, 30 which function as load switches can remain in, or be switched to their open state, wherein the voltage source 12 is isolated from the load 14. The entire electric current flowing between the voltage source 12 and the load 14 is then conducted via the MOSFET disconnecting switch element 22 which is configured as a current monitoring disconnecting switch element such that, in this case, additionally, the current variable actually represents the total electric current flowing via the disconnector assembly 16. It is thus ensured that, even in a low-load state of this type, a sufficiently large current flows via the MOSFET disconnecting switch element 22 to permit accurate current detection.

If, from an initial low-load state of this type, the current flux in the load 14 increases, for example on the grounds of the switch-in of further electrical energy loads, this can result in a state in which the electric current flowing between the voltage source 12 and the load 14 exceeds the maximum permissible current for the MOSFET disconnecting switch element 22 which is configured as a current monitoring disconnecting switch element. This can be detected, for example, wherein the electric current flowing between the voltage source 12 and the load 14 exceeds a threshold current, or the magnitude of the current gradient, that is, the temporal variation of electric current, is such that it exceeds an assigned threshold current gradient. By the employment of a threshold current or threshold current gradient of this type, for example, in the event that at least one of these thresholds is achieved or exceeded, a state in which the entire electric current is conducted via the MOSFET disconnecting switch element 22 which is configured as a current monitoring disconnecting switch element can be terminated, wherein the MOSFET disconnecting switch elements 24, 26, 28, 30 which are not configured as current monitoring disconnecting switch elements are also switched to a conducting state, in which the voltage source 12 is connected to the load 14. Any overloading of the MOSFET disconnecting switch element 22 which is configured as a current monitoring disconnecting switch element can be prevented accordingly.

Via the layout of a disconnector assembly according to the disclosure, or of an on-board voltage network of a vehicle incorporating the latter, it is possible, by the employment of conventional MOSFET disconnecting switch elements, or by a combination of at least one MOSFET disconnecting switch element which is configured as a current monitoring disconnecting switch element with at least one MOSFET disconnecting switch element which is not configured as a current monitoring disconnecting switch element, in a simply structured layout, to permit the reliable delivery of information on the electric current flowing between a voltage source and a load in an on-board voltage network. Given that, according to load demand in the on-board voltage system, the various MOSFET disconnecting switch elements can optionally be switched to a conducting or a non-conducting state, it is possible, even in a state in which only a comparatively small current flows between a voltage source and a load, for this current to be detected in a reliable manner and with an effective dynamic response, but nevertheless preventing any overloading of a MOSFET disconnecting switch element which is configured as a current monitoring switch, even if the latter, on the grounds of its structural configuration, is capable of conducting only a relatively small proportion of the total electric current flowing between the voltage source and the load. The disconnector assembly can thus be operated over a high dynamic range, within a wide range of measurement for the entire electric current flux, with limited power losses and low self-current consumption of the order of a few 100 μA. As conventional proprietary semiconductor components can be employed in the construction of the disconnector assembly, the latter can also be provided in a cost-effective manner, using a structure which operates in a fundamentally reliable manner.

It is understood that the foregoing description is that of the preferred embodiments of the invention and that various changes and modifications may be made thereto without departing from the spirit and scope of the invention as defined in the appended claims.

The invention claimed is:

1. A disconnector assembly for an on-board voltage network of a vehicle including for optionally connecting a voltage source to a load and for isolating the voltage source from the load, the disconnector assembly comprising:

a voltage source terminal region and a load terminal region;

a plurality of MOSFET disconnecting switches mutually connected in parallel;

at least one MOSFET disconnecting switch of said plurality of MOSFET disconnecting switches being configured as a current monitoring disconnecting switch for delivering a current variable representative for a current flowing between said voltage source terminal region and said load terminal region;

at least one MOSFET disconnecting switch of said plurality of MOSFET disconnecting switches being not configured as a current monitoring disconnecting switch;

wherein each one of said plurality of MOSFET disconnecting switches comprises a voltage source terminal connected to said voltage source terminal region, a load terminal connected to said load terminal region, and a gate terminal connected to a control unit;

wherein said at least one of said plurality of MOSFET disconnecting switches configured as a current monitoring disconnecting switch, in a conducting state thereof connecting said voltage source to said load, has a voltage monitoring disconnecting switch resistance between said voltage source terminal thereof and said load terminal thereof;

wherein said at least one MOSFET disconnecting switch not configured as a current monitoring disconnecting switch, in a conducting state thereof connecting said voltage source to said load, has a MOSFET disconnecting switch resistance between said voltage source terminal thereof and said load terminal thereof; and wherein said current monitoring disconnecting switch resistance is greater than said MOSFET disconnecting switch resistance.

2. The disconnector assembly of claim 1, wherein at least one of the following applies:

i) a single one of said plurality of MOSFET disconnecting switches is configured as a current monitoring disconnecting switch; and, ii) a plurality of said plurality of MOSFET disconnecting switches are not configured as current monitoring disconnecting switches.

3. The disconnector assembly of claim 1, wherein each one of said plurality of MOSFET disconnecting switches comprises a drain terminal connected to said voltage source terminal region; a source terminal connected to said load terminal region; and, a gate terminal connected to a control unit.

4. The disconnector assembly of claim 1, wherein a ratio of a total MOSFET disconnecting switch resistance of all the MOSFET disconnecting switches, which are not configured as current monitoring disconnecting switches, to a total MOSFET disconnecting switch resistance of all the MOSFET disconnecting switches, which are configured as current monitoring disconnecting switches, lies within a range of 0.05 to 0.15.

5. The disconnector assembly of claim 1, wherein said at least one MOSFET disconnecting switch configured as a current monitoring disconnecting switch incorporates an overcurrent protection circuit, said overcurrent protection circuit is configured, in the event of an electric current between the voltage source terminal and the load terminal of said at least one MOSFET disconnecting switch, which is configured as a current monitoring disconnecting switch, to switch the at least one MOSFET disconnecting switch, which is configured as a current monitoring disconnecting switch, to a state wherein said voltage source is isolated from the load, or to execute maintenance thereof in this state.

6. The disconnector assembly of claim 1, wherein said at least one MOSFET disconnecting switch, which is configured as a current monitoring disconnecting switch, incorporates an overtemperature protection circuit, said overtemperature protection circuit is configured, in an event of a temperature on said at least one MOSFET disconnecting switch, which is configured as a current monitoring disconnecting switch which exceeds a threshold temperature, to switch said at least one MOSFET disconnecting switch, which is configured as a current monitoring disconnecting switch, to a state wherein said voltage source is isolated from said load, or to execute maintenance thereof in this state.

7. The disconnector assembly of claim 1, wherein said at least one MOSFET disconnecting switch, which is configured as a current monitoring disconnecting switch, independently of at the at least one MOSFET disconnecting switch, which is not configured as a current monitoring disconnecting switch, is switchable to a state for connecting said voltage source to said load, and to a state for isolating said voltage source from said load.

8. The disconnector assembly of claim 1, wherein said at least one MOSFET disconnecting switch, which is configured as a current monitoring disconnecting switch, independently of each MOSFET disconnecting switch, which is not configured as a current monitoring disconnecting switch, is switchable to a state for connecting said voltage source to said load, and to a state for isolating said voltage source from said load.

9. The disconnector assembly of claim 1, wherein all said MOSFET disconnecting switches, which are not configured as current monitoring disconnecting switches, are commonly switchable to a state for connecting said voltage source to said load and to a state for isolating said voltage source from said load.

10. The disconnector assembly of claim 1, wherein at least one of the following applies:

i) said voltage source terminal region comprises a conductor rail connected to all said MOSFET disconnecting switches in an electrically and thermally conductive manner; and, ii) said load terminal region comprises a conductor rail connected to all the MOSFET disconnecting switches in an electrically and thermally conductive manner.

11. The disconnector assembly of claim 10, wherein said electrically and thermally conductive conductor rail is a copper rail.

12. An on-board voltage network for a vehicle, the on-board voltage network comprising:

a voltage source;

a load to be supplied with electrical energy by said voltage source; and, a disconnector assembly for said on-board voltage network of said vehicle including for optionally connecting said voltage source to said load and for isolating said voltage source from the load; said disconnector assembly including: a voltage source terminal region and a load terminal region; a plurality of MOSFET disconnecting switches mutually connected in parallel; at least one MOSFET disconnecting switch of said plurality of MOSFET disconnecting switches being configured as a current monitoring disconnecting switch for delivering a current variable representative for a current flowing between said voltage source terminal region and said load terminal region; and, at least one MOSFET disconnecting switch of said plurality of MOSFET disconnecting switches being not configured as a current monitoring disconnecting switch; and, wherein:

said voltage source terminal region of said disconnector assembly is connected to said voltage source and said load terminal region is connected to said load;

wherein each one of said plurality of MOSFET disconnecting switches comprises a voltage source terminal connected to said voltage source terminal region, a load terminal connected to said load terminal region, and a gate terminal connected to a control unit;

wherein said at least one of said plurality of MOSFET disconnecting switches configured as a current monitoring disconnecting switch, in a conducting state thereof connecting said voltage source to said load, has a voltage monitoring disconnecting switch resistance between said voltage source terminal thereof and said load terminal thereof;

wherein said at least one MOSFET disconnecting switch not configured as a current monitoring disconnecting switch, in a conducting state thereof connecting said voltage source to said load, has a MOSFET disconnecting switch resistance between said voltage source terminal thereof and said load terminal thereof; and wherein said current monitoring disconnecting switch resistance is greater than said MOSFET disconnecting switch resistance.

13. A method for operating an on-board voltage network including: a voltage source; a load to be supplied with electrical energy by said voltage source; and, a disconnector assembly for said on-board voltage network of a vehicle including for optionally connecting said voltage source to said load and for isolating said voltage source from the load; said disconnector assembly including: a voltage source terminal region and a load terminal region; a plurality of MOSFET disconnecting switches mutually connected in parallel; at least one MOSFET disconnecting switch of said plurality of MOSFET disconnecting switches being configured as a current monitoring disconnecting switch for delivering a current variable representative for a current flowing between said voltage source terminal region and said load terminal region; and, at least one MOSFET disconnecting switch of said plurality of MOSFET disconnecting switches being not configured as a current monitoring disconnecting switch; and, wherein: said voltage source terminal region of said disconnector assembly is connected to said voltage source and said load terminal region is connected to said load;

wherein each one of said plurality of MOSFET disconnecting switches comprises a voltage source terminal connected to said voltage source terminal region, a load terminal connected to said load terminal region, and a gate terminal connected to a control unit;

wherein said at least one of said plurality of MOSFET disconnecting switches configured as a current monitoring disconnecting switch, in a conducting state thereof connecting said voltage source to said load, has a voltage monitoring disconnecting switch resistance between said voltage source terminal thereof and said load terminal thereof;

wherein said at least one MOSFET disconnecting switch not configured as a current monitoring disconnecting switch, in a conducting state thereof connecting said voltage source to said load, has a MOSFET disconnecting switch resistance between said voltage source terminal thereof and said load terminal thereof; and wherein said current monitoring disconnecting switch resistance is greater than said MOSFET disconnecting switch resistance;

the method comprising the steps of:

in a low-load operating state of said on-board voltage network, switching said at least one MOSFET disconnecting switch configured as a current monitoring disconnecting switch to a state for connecting said voltage source to said load; and, switching at least one MOSFET disconnecting switch not configured as a current monitoring disconnecting switch to a state for isolating said voltage source from said load.

14. The method of claim 13, wherein at least one of the following applies:

i) in the low-load operating state, said at least one MOSFET disconnecting switch configured as a current monitoring disconnecting switch is switched to a state for connecting said voltage source to the load; and, ii) each MOSFET disconnecting switch not configured as a current monitoring disconnecting switch is switched to a state for isolating said voltage source from said load.

15. The method of claim 13, wherein, in the event that, in a low-load operating state, all MOSFET disconnecting switches not configured as current monitoring disconnecting switches are switched to a state for isolating the voltage source from the load, at least a proportion of the MOSFET disconnecting switches not configured as current monitoring disconnecting switches should be switched to a state for connecting the voltage source to the load, in the event that the magnitude of current delivered by the at least one MOSFET disconnecting switch configured as a current monitoring disconnecting switch indicates an electric current which exceeds a current threshold and/or indicates a temporal variation in the electric current which exceeds a threshold current gradient.

16. The method of claim 13, wherein, in the event that, in a low-load operating state, all MOSFET disconnecting switches not configured as current monitoring disconnecting switches are switched to a state for isolating the voltage source from the load, all of the MOSFET disconnecting switches not configured as current monitoring disconnecting switches should be switched to a state for connecting the voltage source to the load, in the event that the magnitude of current delivered by the at least one MOSFET disconnecting switch configured as a current monitoring disconnecting switch indicates an electric current which exceeds a current threshold and/or indicates a temporal variation in the electric current which exceeds a threshold current gradient.

17. The method of claim 13, wherein, when the voltage source is to be connected to the load via the disconnector assembly, at least the at least one MOSFET disconnecting switch configured as a current monitoring disconnecting switch is switched to a state for connecting the voltage source to the load.

* * * * *